A. KRAEMER.
PIPE COUPLING.
APPLICATION FILED OCT. 11, 1913.

1,103,212.

Patented July 14, 1914.

Witnesses
Harry S. Gaither
M. A. Milord

Inventor
Augustus Kraemer
by Frederick Benjamin
Atty.

UNITED STATES PATENT OFFICE.

AUGUSTUS KRAEMER, OF TRES PINOS, CALIFORNIA.

PIPE-COUPLING.

1,103,212.  Specification of Letters Patent.  Patented July 14, 1914.

Application filed October 11, 1913. Serial No. 794,540.

*To all whom it may concern:*

Be it known that I, AUGUSTUS KRAEMER, a citizen of the United States, residing at Tres Pinos, in the county of San Benito and State of California, have invented certain new and useful Improvements in Pipe-Couplings, of which the following is a specification.

This invention relates to improvements in pipe couplings, and more especially to the type of such couplings used in connection with hose or other form of water and air conduit pipe where it is desirable to provide a leak proof coupling of simple and economical form and one that will facilitate the quick detachment and attachment of the pipe in which said coupling is inserted.

A further object of my invention is to provide a coupling whereby a fire hose may be quickly attached to a hydrant and will withstand the unusual pressure incident to the use of hose of this character.

A further object is to provide a pipe coupling that may be used if desired without gaskets and without a threaded engagement between the parts of which the coupling is formed.

Other objects of general utility are conserved by my automatic coupling hereinafter described, which will be readily apparent to those skilled in the art and need not be set forth in detail.

Figure 1:
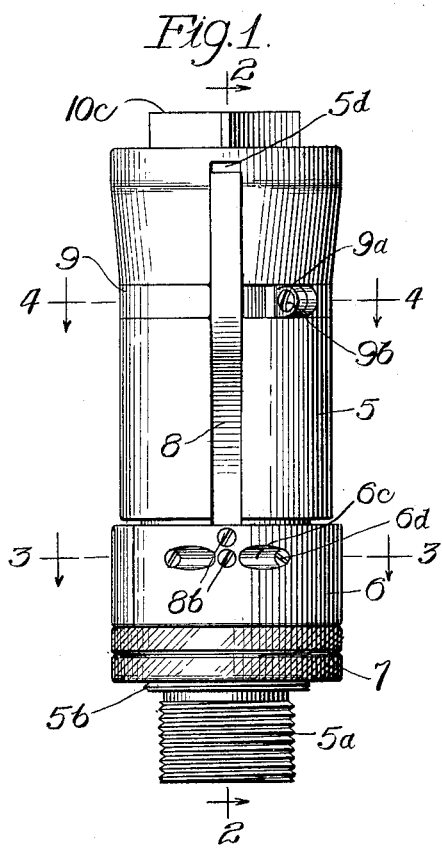
Figure 2:
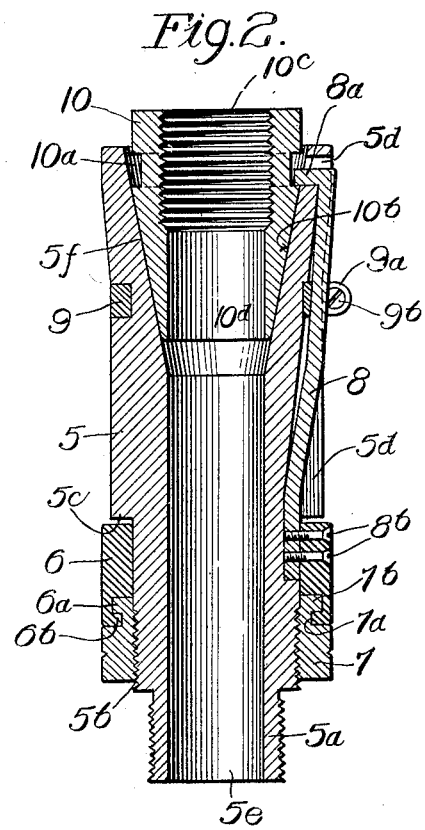
Figure 3:
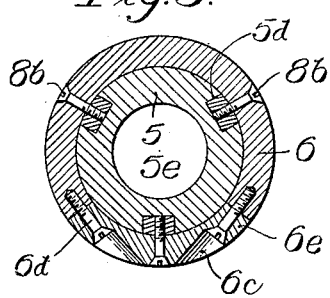
Figure 4:
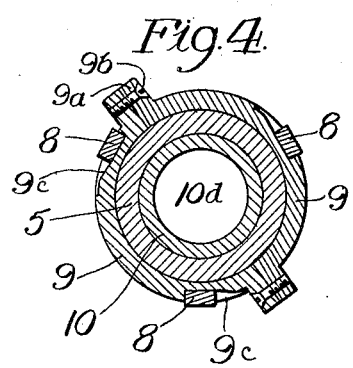

Referring to the accompanying drawings, forming part of this application: Figure 1 shows in elevation a coupling of a single type constructed according to my invention; Fig. 2 is a longitudinal section on the line 2—2 of Fig. 1; Fig. 3 is a cross-section on the line 3—3 of Fig. 1, and Fig. 4 is a cross-section on the line 4—4 of Fig. 1.

The reference character 5 represents the main or body member of the coupling, and 10 the nipple or complementary member which interfits the body, as clearly shown in Fig. 2. The body 5 may be made in any size and shape desired for the purpose for which it is intended, and at one end is provided with a reduced and externally threaded extension $5^a$. The portion adjacent the extension is also externally threaded, as at $5^b$, said latter portion being of greater diameter than the extension $5^a$, but of less diameter than the main portion of the member so as to provide the annular shoulder $5^c$. Extending longitudinally of the walls of the member 5 are three grooves $5^d$, the same terminating a short distance from one end of the member 5. The main bore of the member 5 is cylindrical and of uniform diameter as at $5^e$, but for a portion of the length of said member the bore is in truncoconical form so as to provide the tapering walls $5^f$.

Arranged upon the reduced portion of the body 5 between the threaded portion $5^b$ and the shoulder $5^c$ is a cylindrical sleeve 6 formed with an annular groove $6^a$ on its inner wall and near one end bounded by an annular shoulder $6^b$. Adjacent the sleeve 6 a nut 7, internally threaded to engage the threads $5^b$, is formed with an annular external shoulder $7^b$ and a groove $7^a$, said shoulder and groove interfitting the corresponding groove and shoulder of the sleeve 6. In order to assemble said sleeve and nut, the former is made with a removable segment $6^c$ which is attached to the adjacent portions of the ring 6 by screws $6^d$ which are accessible through recesses $6^e$, cut in the outer face of the segment $6^e$, as clearly shown in Fig. 3.

Arranged in each of the grooves $5^d$ is a spring tongue 8, one end of which extends at right angles to form a hook $8^a$, and the other end is secured to the inner side of the sleeve 6 by screws $8^b$, as shown in Fig. 2. The spring hooks 8 rest upon a two-part ring 9, each of said parts being formed with outwardly extending lugs $9^a$ through which screws $9^b$ extend to fasten the two halves together, as shown in $9^b$. Beveled seats $9^c$ are cut in the outer face of these ring sections, in which lie the spring arms 8. The nipple 10 which interfits with the coupling member 5, is provided with an annular groove $10^a$ in its outer wall and near its outer end, said groove being adapted to receive the hooks $8^a$ of the spring arms 8 when the same are in their innermost positions, and are somewhat larger than the thickness of said hooks so as to provide a certain amount of longitudinal play for said hooks in the adjustment of the device. The outer wall of the nipple 10 is beveled as at $10^b$, to fit the correspondingly tapered wall $5^f$ of the member 5 and the bore of the nipple $10^d$ registers with the cylindric bore $5^e$ of the member 5. The bore of the nipple is also internally threaded as at $10^c$ to receive the external threads of a faucet or hose collar or other terminal with which it is desired to connect my improved coupling.

In a device constructed in substantial accordance with the drawings and above description, it will be apparent that if the nipple 10 is screwed into place, upon a faucet for instance, and it be desired to connect a hose, equipped with the other end of my improved coupling, with said faucet, it will be necessary merely to attach the mouth or enlarged bore end of the body 5 to the nipple and push upwardly or inwardly upon the latter until the hooked ends 8ª enter the recesses 10ª, whereupon the water entering under pressure the bore of the nipple 10 will not be able to dislodge or disconnect the member 5 and whatever may be attached to the threaded extension 5ª of said member. In order to effect a tight connection between the tapering walls of the nipple and the corresponding walls of the body 5, it will be apparent that by turning the nut 7, the sleeve 6, to which the inner ends of the spring arms 8 are secured, will be moved longitudinally, thus forcing the hooks in a corresponding direction, and effect as close a union between the two members as their respective structures will permit. It will also be apparent that by partially rotating the collar 4 in one direction, the spring arms 8 will be pressed outwardly by the inclined walls of the recesses 9ᶜ and thus the hooked ends 8ª of the spring arm 8 will be forced outwardly so that the coupling members 5 and 10 may be instantly disconnected. The projecting lugs 9ª serve as convenient grasping members for turning the collar 4 as well as to provide threaded bearings for the attaching screws 9ᵇ.

In the use of my device either the member 5 or the member 10 may be left in position upon the article to which it is desired to connect a hose or other extension, but in practice I prefer to use the nipple 10 in this position as it is small and will not interfere with the ordinary use of a faucet.

I have not shown the use of gaskets with my improved coupling as same are of common use with devices of this character, nor do I wish to be understood as indicating the exact details of construction, as these may be varied within the limitations of my invention.

I claim as new:—

1. A coupling, consisting of a cylindric body member having a portion of its internal bore tapering outwardly, a sleeve slidably and non-rotatably mounted on said body portion, a nut having a threaded engagement with said body portion and engaging said sleeve to move same longitudinally upon the rotation of said nut, yielding hook shaped arms secured at one end to said sleeve and movable longitudinally in ways formed therefor in said body portion, a nipple having a tapering face adapted to fit the tapering face of the body member of the coupling, means on said nipple adapted to be engaged by said hook shaped arms, and means for disengaging said arms from said means.

2. A coupling, consisting of a cylindric body member having a portion of its internal bore tapering outwardly, a sleeve slidably and non-rotatably mounted on said body portion, a nut having a threaded engagement with said body portion and engaging said sleeve to move same longitudinally upon the rotation of said nut, yielding hook shaped arms secured at one end to said sleeve and movable longitudinally in ways formed therefor in said body portion, a nipple having a tapering face adapted to fit the tapering face of the body member of the coupling, said nipple having recesses adapted to be engaged by said hook-shaped arms, and a collar adapted to disengage said arms from said recesses.

In testimony whereof I affix my signature in the presence of two witnesses.

AUGUSTUS KRAEMER.

Witnesses:
TIMOTHY O'CONNOR,
HENRY E. BRYAN.